United States Patent [19]

Gloor

[11] Patent Number: 4,964,839
[45] Date of Patent: Oct. 23, 1990

[54] DRIVE SHAFT WITH A COUPLING ARRANGEMENT

[75] Inventor: Peter Gloor, Tolfen, Switzerland

[73] Assignee: Rosy B. Versand GmbH, Mittenwald, Fed. Rep. of Germany

[21] Appl. No.: 262,711

[22] Filed: Oct. 26, 1988

[30] Foreign Application Priority Data

Oct. 26, 1987 [DE] Fed. Rep. of Germany ....... 3736196
Nov. 26, 1987 [DE] Fed. Rep. of Germany ....... 3740172

[51] Int. Cl.$^5$ .............................................. F16D 1/10
[52] U.S. Cl. ....................... 464/29; 464/52; 464/182; 464/901
[58] Field of Search ................... 81/125; 464/29, 51, 464/52, 53, 57, 58, 173, 174, 182, 183, 901

[56] References Cited

U.S. PATENT DOCUMENTS

| | | | |
|---|---|---|---|
| 1,039,342 | 9/1912 | Wheelock | 464/52 |
| 1,115,337 | 10/1914 | Rossetter | 464/901 X |
| 2,596,335 | 5/1952 | Kessler | 464/53 |
| 2,840,673 | 6/1958 | Burton | 464/52 X |
| 3,731,722 | 5/1973 | Carr | 81/125 X |
| 4,643,052 | 2/1987 | Badiali | 81/125 X |

Primary Examiner—Daniel P. Stodola
Attorney, Agent, or Firm—Morgan & Finnegan

[57] ABSTRACT

A drive shaft connectable to a motor or geared motor and including a coupling arrangement attachable to tool shafts of rotating tools having, for example, heads for milling, polishing or grinding, so that easy handling of the tools is accomplished in processing small pieces of work and in beauty treatment applications while permitting easy connection to and rapid change of the tools with the coupling element. The drive shaft consists of flexible steel wire of circular profile, or of flexible steel wire with several concentric layers of wire wound around a core of flexible steel wire and having a circular profile and which is disposed in a tightly wound coiled tube made of synthetic material or steel wire. A tubular housing is attached to the coiled tube on the side away from the motor and in which a cylindrical coupling element is disposed, so that it can be rotated. A permanent magnet is secured in the coupling element whose rear end is firmly attached centrically to the forward end of the drive shaft. The coupling element has a hole of rectangular or polygonal cross-section in its front end-face running longitudinally and into which the cylindrical tool-shaft may be pressed through an opening in the housing front. The end part of the shaft corresponds in cross-section to the hole and has a smooth end-face, which, when coupled, sits flat on the smooth pole face of the magnet which forms the floor of the hole.

6 Claims, 1 Drawing Sheet

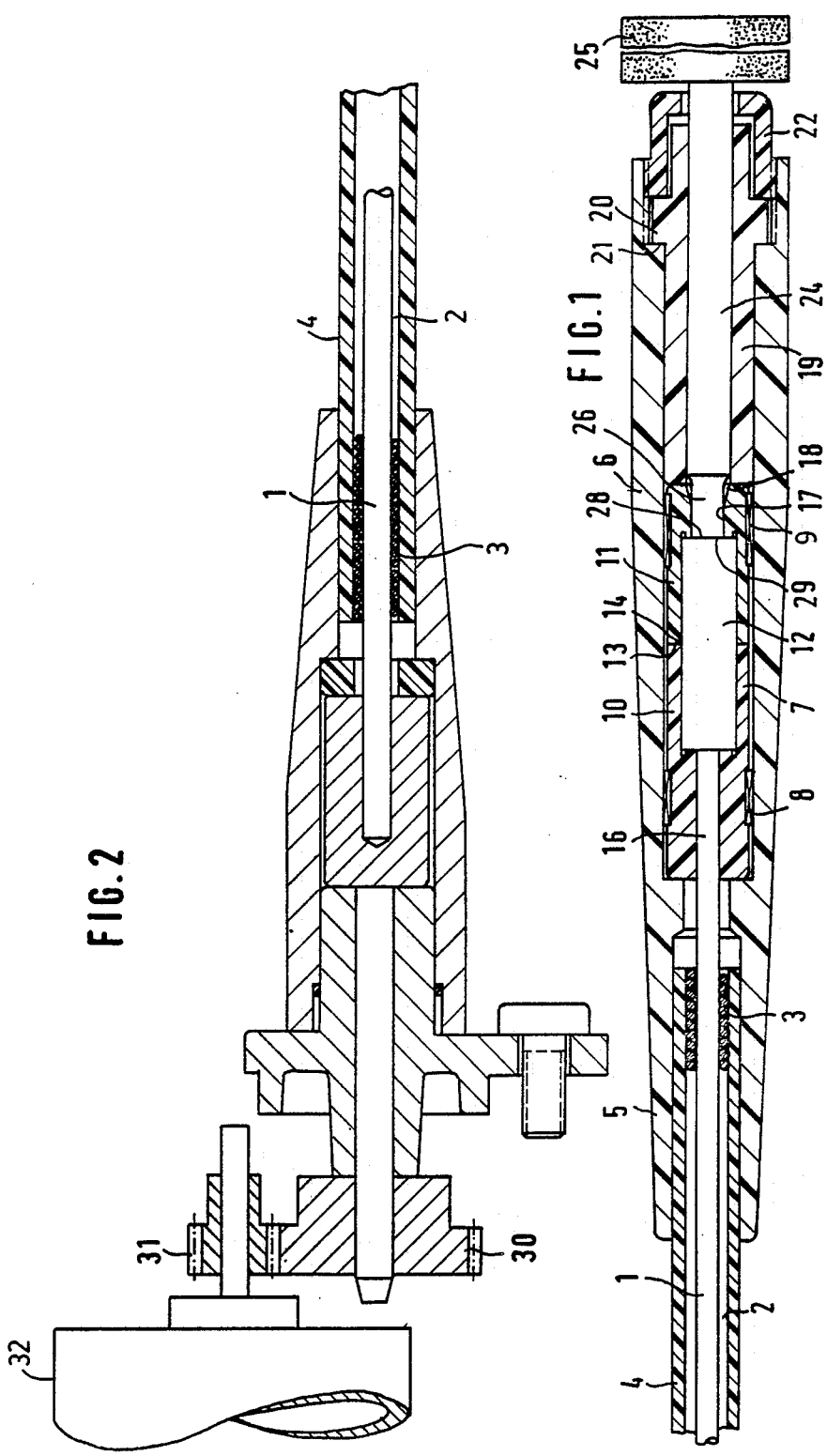

DRIVE SHAFT WITH A COUPLING ARRANGEMENT

This invention relates to a drive shaft connectable for driving purposes to a motor or a geared motor. It is made of flexible steel wire with a round profile, or of flexible steel wire with several concentric layers of wire wound around this core, positioned in a tube made of synthetic material or coiled steel wire which should be tightly bound around the steel wire of round profile on the core. It has a coupling arrangement for the attachment of symmetrically rotating tools, with, for example, heads for milling, polishing or grinding purposes, the attachment being made through the shaft of the particular tool with which it is utilized. Further, it has a tubular housing attached to the coiled tube on the side away from the motor in which a cylindrical coupling element is placed in such a way that it can be rotated.

In the case of an already known drive shaft as dealt with in FR-PS 21 82 364, there is disclosed a coupling arrangement of the kind described above for use in dentistry practices, the tubular housing, which forms a hand piece, in which the working element is placed so that it may rotate, is provided with a coupling element in the form of a capsule into which a coupling element in the shape of a thorn on the end of the flexible drive may be guided. The later is held together by a connector and a spring lever on the &horn-like part, whose front end, which is angled in the form of a hook, snaps into a notched recess on the outside of the capsule, so that it will hold. This well-known form of drive shaft is relatively expensive and each time a tool is changed the tubular housing forming the hand-piece also has to be exchanged.

The task of the present invention is to produce a drive shaft with a coupling arrangement, described hereinabove, whose simple construction and easy handling of the tools enables them to be easily attached to the coupling arrangement and to be exchanged quickly.

The present invention accomplishes this task by providing a drive shaft of the kind described above that, firstly, has a permanent magnet having a smooth pole face secured in the coupling element, whose rear end is attached centrically to the forward end of the drive shaft. Secondly, the coupling element has a hole which is rectangular or polygonal in cross-section; in the middle of its front end-face and which runs longitudinally therein and into which the cylindrical tool shaft may be pressed through an opening in the front of the housing. The end part of the shaft corresponds to the cross-sectional shape of the hole and has a smooth end-face, which, when coupled to the coupling element, sits flat on the smooth pole face of the magnet, which forms the base of the hole.

Thirdly, the opening of the hole in the coupling element is funneled away from the edge of the opening. Fourthly, a piece of piping is fitted in the front part of the housing of the coupling element and forms a positioning and guiding bushing for the tool-shaft. In the equipment which is the subject of the invention, the coupling arrangement is located in a handy tubular housing, which can be maneuvered sensitively by the user in the same way as a pencil, because the flexible drive shaft, which is held and guided by a flexible tube, does not result in any significant hindrance to the freedom of movement. The various tool-heads can be simply and quickly attached to the coupling arrangement by being pressed thereon. When coupled, the tool shafts are held firmly by the magnet, because the tool-heads are only subjected to pressure which is longitudinal in an inwards direction or radially. The tool-shafts are held in the axial hole of the coupling element containing the holding magnet in such a way that they can be moved in the direction of their axis, but cannot be turned. The hole can, of course, have a cross-section that is not polygonal, so long as this form prevents the shaft which has been inserted from being turned. For example, the hole can have longitudinal grooves, and the shaft, corresponding protuberances along its axis. A chord-like flattening of a hole of round cross-section is also sufficient to provide a mounting which will prevent turning. Since the hole is funneled away from the edge of the opening, the safe coupling of the tool-shaft is ensured, even if it's one-sided protuberance is not exactly aligned in the correspondingly profiled hole in the coupling element. This is so because the magnet draws the tool-shaft, in cases where it has been inserted crookedly; to correct alignment in the hole as soon as the driving motor is started and the shaft starts to turn. The front piping of the housing provides a simple positioning and guiding bushing for the tool-shaft. This bushing should preferably be made of synthetic material. It can also be made of anti-friction metal, which displays good sliding properties with respect to the steel tool-shaft. The tubular housing should also preferably be made of synthetic material.

The device which is the subject of the invention is particularly suitable for tools which are used for health and beauty care purposes, for the polishing and filing of finger and toe nails, and callouses, corns and other deformities resulting from the thickening or hardening of the skin. It can also be used for the sensitive processing of small pieces of work in other fields.

Magnetic coupling elements, which make up part of the invention, are in principle, known in boring machines technology and in similar appliances for the attachment of screwdrivers etc. For example, DE-OS 32 00 462 discloses a coupling attachment for a portable electric drill with a device for limiting the torque, in which the six-cornered shaft of a Philips screwdriver is held in a complementary hole by a permanent magnet. In this well-known device, the coupling attachment turns together with the drill-chuck so that the machine can only be handled by the housing covering the motor and a drive. Such well-known equipment of this type turns at a relatively low number of revolutions, and the shafts of the tools are relatively broad in diameter, sr, that the force exerted on them by the holding magnets is relatively great. In contrast, the drive shaft of the instant invention car turn at rates between 3,000 and 10,000 rpm, ideally at between 5,000 and 6,000 rpm, in the applications foreseen by the invention.

The invention design foresees that the area of the end of the tool-shaft supported by the pole surface will be between 2 and 10 sq mm. In connection with the instant invention, it is surprising that the toolheads are still held firmly when the shaft diameter is so small. The invention therefore makes it possible for small, high-revolution tool-heads to be held firmly in the coupling appliance, while providing a rapid means of changing them.

The coupling element can consist of two capsule-formed parts, which are connected together at their extremities after the bar-like magnet has been applied, for instance by means of an adhesive or a clamped connector.

The coupling element can be positioned in the housing by a synthetic friction bearing or a needle bearing.

The bushing which is to receive the tool-shaft has a practical flange or collar resting on a shoulder in the bore of the housing and held against the housing by a union nut or a screwed in, lid-like holder with a rim, in the form of a stepped ring.

It is most practical when the flexible drive is made of flexible wire with several concentric layers of wire wound about it. It is advantageous when each layer is made of 4–12 wires wound spirally. Such flexible drives are well-known for use as speedometer cables, propeller shafts, high-performance drives and remote control drives, and are sold, for instance, by Suhner.

An example of an application for the invention will now be described based on the drawing wherein.

FIG. 1 is a partial longitudinal sectional view through the drive shaft of the invention, including the coupling attachment; and FIG. 2 is a partial sectional view of the rear part of the drive shaft shown in FIG. 1 attached to a geared motor.

The drive 1, which is made of flexible steel wire or a steel wire with several layers wound around it, is disposed in and guided by a tube 2, made of synthetic material or coiled steel wire, whose coils 3 are tightly bound together. The tubular coiled steel wire has a cover 4 made of synthetic material. The forward end of the tubular coiled steel wire is attached to the rear end 5 of a tubular housing 6 made of synthetic material. A cylindrical coupling element 7 is located in the housing 6 by means of a synthetic friction bearing 8 or needle roller bearing 9, respectively, so that it can be rotated. The cylindrical coupling element 7 consists of two capsule-shaped parts 10 and 11, which encase a bar-magnet 12, and are stuck together with an adhesive at their facing edges 13 and 14 or are, for example, clamped together by means of teeth in their edges.

The forward end 16 of the flexible drive 1 is secured in a hole in the middle of the rear capsule-shaped part 10 in such a way that it cannot turn.

The front part of the base of the capsule-shaped part 11 has a hole 17 in the middle with a rectangular cross-section. The exterior end of this hole is funneled with appropriate declinations 18.

A synthetic bearing 19 which acts as a bushing is held in the housing 6 immediately behind the coupling element 7 and which has a round flange 20 at its far end. This ring-like flange 20 is held by a circular shoulder 21 in the bore of the housing 6. The far end of the bore of the housing has an internal thread into which a lid-like end piece 22 is screwed, which secures the ring-flange 20 between itself and the shoulder 21. The shaft 24 of a tool, which has a head 25, for instance for milling, polishing or grinding purposes, is guided and held by the bushing 19. The inner end 26 of the circular steel shaft is in the form of a square, whose measurements correspond to the cross-section of the hole 17 in such a way that it is secured and cannot be turned but can be moved in a longitudinal direction in the hole. The shaft has a flat base 28 so that it fits exactly onto the smooth pole surface 29 of the magnet 12.

As can be seen from FIG. 2 there is a cogged wheel 30 attached to the motor end of the flexible drive 1, which mates with the drive pinion 31 of the motor 32.

What is claimed is:

1. Drive shaft, connectable for driving purposes to a motor or geared motor, said drive shaft being made of flexible steel wire with a round profile, or flexible steel wire with several concentric layers of wire wound around a core made of flexible steel wire with a round profile and being disposed in a tube of synthetic material or coiled steel wire tightly bound therearound and including a coupling element for attachment of said drive shaft to a tool-shaft of a symmetrically rotating tool provided with a head for milling, polishing or grinding purposes, a tubular housing (6) attached to said tube on the side away from said motor or geared motor, and cylindrical coupling element rotatably disposed in said housing, said drive shaft characterized by a permanent bar magnet (12) secured in the coupling element (7), the rear end of which is firmly attached centrically to the forward end of said drive shaft (1), said coupling element having a front end-face and a hole (17) having a cross-sectional shape compatible with said tool-shaft and in which said tool-shaft cannot turn in the middle thereof running longitudinally therein, and into which said tool-shaft (24) is disposed through an opening in the front of said housing (6), the end part (26) of said tool-shaft corresponding to the cross-sectional shape of said hole (17) and having a flat end-face, which, when in coupled position, sits flat on the smooth pole face (29) of said bar magnet which forms the base of said hole (17), the opening of said hole (17) in the coupling element (7) being funneled away from the edge of said opening, and a piece of piping (19) fitted in the front part of said housing which forms a positioning and guiding bushing for said tool-shaft (24).

2. Drive shaft according to claim 1, characterized by the fact that the area of the base (28) of the tool-shaft (24) is totally supported by the pole face (29) of the bar magnet (12) and is between 2 and 10 sq mm.

3. Drive shaft according to claim 1, characterized by the fact that the drive shaft (1) has a cover (4) of synthetic material.

4. Drive shaft according to claim 1, characterized by the fact that the coupling element (7) consists of two capsule-formed parts (10 and 11) which are connected to one another at their extremities with an adhesive or a clamped connector.

5. Drive shaft according to claim 1, characterized by the fact that the coupling element (7) is positioned in the housing (6) by a synthetic friction bearing (8) or a needle roller bearing 9.

6. Drive shaft according to claim 1, characterized by the fact that the bushing (19) has a flange or collar (20) resting on a shoulder (21) in the bore of the housing (6) and is held against said shoulder by a union nut or a screwed-in, lid-like holder (22) in the form of a stepped ring.

* * * * *